A. C. REID.
RECTIFIER SYSTEM.
APPLICATION FILED JUNE 24, 1920.
1,418,398.
Patented June 6, 1922.
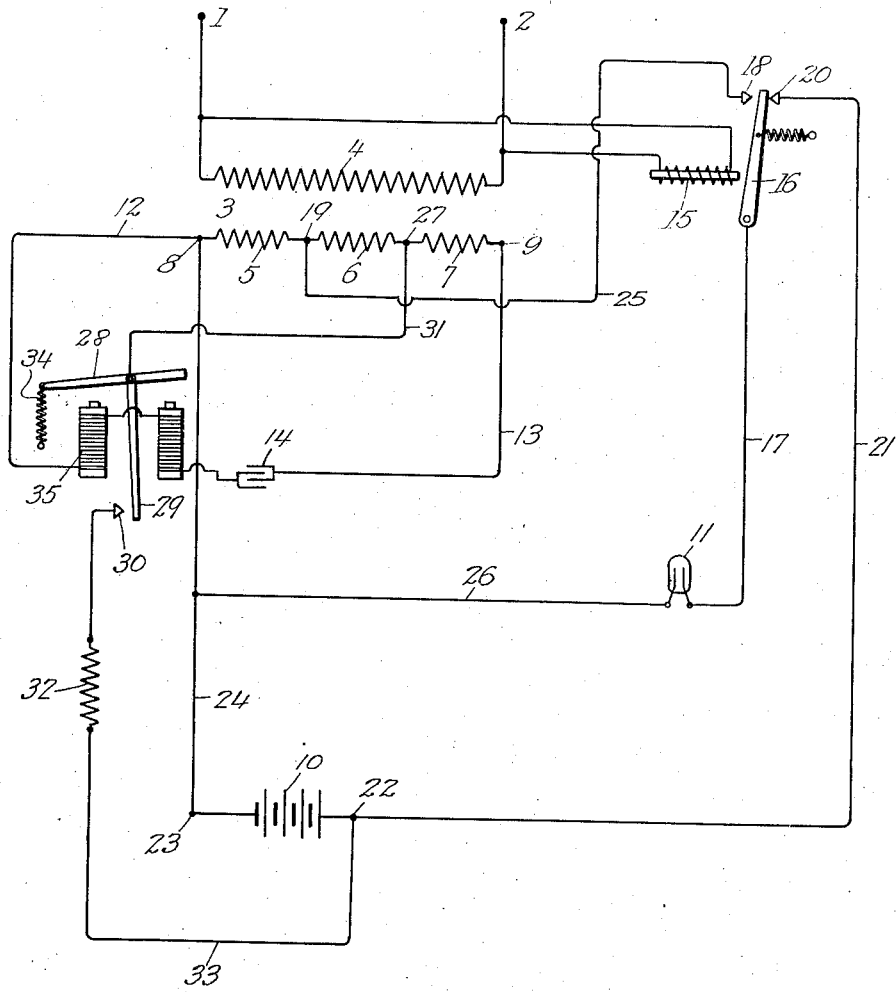
Inventor
Alexander C. Reid
by Gabel & Mueller Attys

UNITED STATES PATENT OFFICE.

ALEXANDER C. REID, OF GENOA, ILLINOIS, ASSIGNOR TO LEICH ELECTRIC CO., OF GENOA, ILLINOIS.

RECTIFIER SYSTEM.

1,418,398. Specification of Letters Patent. Patented June 6, 1922.

Application filed June 24, 1920. Serial No. 391,380.

*To all whom it may concern:*

Be it known that I, ALEXANDER C. REID, a citizen of the United States, residing at Genoa, in the county of De Kalb and State of Illinois, have invented a certain new and useful Improvement in Rectifier Systems, of which the following is a full, clear, concise, and exact description, reference being had to the accompanying drawings, forming a part of this specification.

My invention relates to rectifier or similar systems and has for its object the provision of an improved circuit arrangement together with the necessary apparatus therefor to improve the art of alternating current rectification or modification.

My invention is furthermore concerned with the provision of a system of this character in which a suitable consumption circuit may be supplied interchangeably with current from a source of alternating current or a battery, and the additional provision of a rectifier serving the purpose of maintaining the battery in a proper state of charge.

My invention concerns itself particularly in a system of this kind in one of its forms with the provision of a transformer by virtue of which various secondary voltages of different intensities may be obtained to accomplish certain purposes which will be more clearly explained in connection with the accompanying drawing, illustrating one form which my system may take.

In this drawing I show a source of alternating current indicated by the terminals 1 and 2. This alternating current source may, for instance, be assumed to be a 60 cycle, 110 volt system. A transformer 3 having a primary winding 4 is connected in bridge of the terminals 1 and 2. The transformer 3 also has a secondary winding consisting of the three sections 5, 6 and 7 which together serially form the secondary winding. In the proportions which are herein assumed for this particular case, the voltage across the terminals 8 and 9 of the secondary winding, is twenty-five volts. The voltage across the terminals of the coils 5, 6 and 7, in each case is about one-third of the total voltage.

In connection with this transformer there is provided what may be called an 8-volt storage battery 10. This storage battery when discharging its current, serves a consumption circuit typified by the signal 11 with a direct current of about eight volts. The battery is designed to be charged from the alternating current source through the agency of a rectifier 35. This rectifier is, by means of the conductors 12 and 13, connected in bridge across the terminals 8 and 9. Under this condition of things, the rectifier itself is operated at a voltage of twenty-five volts.

Now it will be noted that the voltage of the storage battery is less than twenty-five volts. It has been found in practice that in meeting the demands for various kinds of equipment of this nature, that is, a battery and alternating source of current and suitable means for charging the battery, and furnishing current from the battery or the alternating source for a consumption circuit, that the storage batteries are chosen to have a voltage corresponding to various local conditions. Thus, a tap may be taken from the secondary winding at any suitable place, depending upon the particular voltage which the storage battery may be designed for, all as will be presently explained. The rectifier voltage, however, remains constant at twenty-five volts regardless of the voltage of the storage battery which is selected to work in co-operation therewith.

It is of prime importance in the design of apparatus of this character that certain constants be maintained. For this reason, a transformer is chosen primarily whose total secondary winding works satisfactorily in connection with a given type of rectifier, and a suitable condenser 14 is selected in combination with the rectifier so that this rectifier will vibrate synchronously with the alternating current. It is a subject matter of much experimentation to ascertain the correct constants required for three co-operating elements such as secondary winding, rectifier and condenser, in order to have them operate positively in synchronism. The apparatus, however, must be flexible so that batteries of different voltages may be used in connection therewith. It will be noted that the battery may have varying voltages and the consumption circuit may have varying voltages, within proper limits, of course, whilst yet maintaining the co-operational characteristics between secondary winding, rectifier and condenser.

It is assumed that the voltage of the consumption circuit typified by the signal 11 is to be eight volts. Now it is of course understood that when the rectifier charges the storage battery 10 that a voltage higher than eight volts must be impressed upon this storage battery. A suitable arrangement is provided whereby the consumption circuit typified by the signal 11 may be served with current either from the battery 10 or directly from the secondary winding.

For this reason, a relay 15 is provided which is connected directly to the terminals 1 and 2. The relay has an armature 16 which leads by means of the conductor 17 to the consumption circuit. The armature 16 also has a front contact 18 which is connected directly with terminal 19 taken off of the secondary winding of the transformer 3. The armature 16 also co-operates with a back contact 20 which is connected by means of a conductor 21 with the terminal 22 of the battery 10. The terminal 23 of the battery is connected to the terminal 8 of the secondary winding of the transformer 3 by means of conductor 24. The front contact 18 of the relay is connected by means of conductor 25 with the terminal 19 and the remaining terminal of the consumption circuit typified by the signal 11 is connected by means of conductor 26 to the conductor 24. Now whenever the alternating current source is intact, then the relay 15 is energized and the signal circuit receives its current at eight volts directly from coil 5 of the secondary winding. Whenever the alternating current source fails, then the armature 16 is retracted and the consumption circuit receives its current from the storage battery 10. Now in order to properly charge the storage battery, it must be charged at a voltage in excess of eight volts. For this reason, the secondary winding is taped at any point indicated at 27 which tap is between the coils 6 and 7. The rectifier thus feeds rectified current to the battery at a voltage equivalent to the sums of the voltages of the coils 5 and 6 for charging purposes. It will be noted that the rectifier has a pivotally mounted armature 28 carrying a vibratory element 29 which co-operates with a contact 30. The arrangement is such that the rectifier selects only the waves of the alternating current of the same polarity, the waves of opposite polarity being eliminated. The charging circuit thus extends from terminal 27 by way of conductor 31, vibratory element 29, contact 30, resistance 32, conductor 33 to the terminal 22 of the battery, through the battery to the terminal 23, conductor 24 and terminal 8 of the secondary winding.

Now it will be noted that the terminals 19 and 27 may be selected at any point intermediate the terminals 8 and 9 to correspond to the particular voltage of storage battery which it is intended to utilize. The co-operational characteristics of the total secondary winding, rectifier 35 and the condenser 14 are not disturbed by such change of the taps 19 and 27. A biasing spring 34 normally holds the armature 28 in such position that the vibratory element 29 is away from the contact 30.

It will be noted that the rectifier maintains the battery in a proper state of charge during those intervals when the alternating current source of supply is intact. When this source fails for any reason whatsoever, the signal circuit typified by the signal 11, is maintained in proper state of actuation by the battery 10. The circuits of this nature are of particular value in connection with railroad systems, both for signaling and track purposes where it is absolutely essential that there be no failure in the consumption circuit. A system as herein disclosed is of value for the purpose specified and, of course, for many others.

In order to more clearly identify a particular style of rectifier which serves satisfactorily in connection with a system such as this, I may refer to a co-pending patent application filed March 24, 1919, by Oscar M. Leich, Serial Number 284,523, now Patent No. 1,366,395, patented Jan. 25, 1921. It will be understood that various modifications may be made from the form or arrangement herein disclosed without departing from the spirit of my invention.

Having, however, thus described one form which my invention may take, what I claim as new and desire to secure by Letters Patent is:

1. A system of the character described comprising, a winding serving as a source of alternating current, a consumption circuit, a battery, a rectifier proportioned to operate synchronously and connected to said source of alternating current and feeding rectifier current to said battery, the connections being such that said rectified current is obtained from said source of alternating current at a voltage differing from the voltage utilized for actuating said rectifier, and means responsive to electrical conditions of said source of alternating current for alternatively associating said consumption circuit with said battery and source of alternating current respectively.

2. A system of the character described comprising, a winding serving as a source of alternating current, a consumption circuit, a battery, a rectifier proportioned to operate synchronously and connected to said source of alternating current and feeding rectified current to said battery, the connections being such that said rectified current is obtained from said source of alternating current at a voltage less than the voltage utilized for actuating said rectifier, and means responsive to electrical conditions of said source of alternating current for alternatively associating said consumption circuit with said battery and source of alternating current respectively.

3. A system of the character described comprising, a winding serving as a source of alternating current, a consumption circuit, a battery, a condenser, a rectifier proportioned in connection with said condenser to operate synchronously and connected to said source of alternating current and feeding rectified current to said battery, the connections being such that said rectified current is obtained from said source of alternating current at a voltage differing from the voltage utilized for actuating said rectifier, and means responsive to electrical conditions of said source of alternating current for alternatively associating said consumption circuit with said battery and source of alternating current respectively.

4. A system of the character described comprising, a winding serving as a source of alternating current, a consumption circuit whose established voltage is less than the voltage of said source of alternating current, a battery of a voltage sufficient to supply current to said consumption circuit, means responsive to electrical conditions of said source of alternating current for alternatively associating said consumption circuit with said battery and a portion of said winding of a voltage commensurate with the established voltage of said consumption circuit, and a rectifier proportioned to operate synchronously and connected to said source of alternating current and feeding rectified current to said battery.

5. A system of the character described comprising, a winding serving as a source of alternating current, a consumption circuit whose established voltage is less than the voltage of said source of alternating current, a battery of a voltage sufficient to supply current to said consumption circuit, means responsive to electrical conditions of said source of alternating current for alternatively associating said consumption circuit with said battery and a portion of said winding of a voltage commensurate with the established voltage of said consumption circuit, and a rectifier proportioned to operate synchronously and connected to said source of alternating current and feeding rectified current to said battery, said rectified current being obtained from a portion of said winding so that the voltage thereof is in excess of the battery voltage.

6. A system of the character described comprising, a winding serving as a source of alternating current, a consumption circuit whose established voltage is less than the voltage of said source of alternating current, a battery of a voltage sufficient to supply current to said consumption circuit, means for alternatively associating said consumption circuit with said battery and a portion of said winding of a voltage commensurate with the established voltage of said consumption circuit, and a rectifier proportioned to operate synchronously and connected to said source of alternating current and feeding rectified current to said battery.

7. A system of the character described comprising, a winding serving as a source of alternating current, a consumption circuit whose established voltage is less than the voltage of said source of alternating current, a battery of a voltage sufficient to supply current to said consumption circuit, means for alternatively associating said consumption circuit with said battery and a portion of said winding of a voltage commensurate with the established voltage of said consumption circuit, and a rectifier proportioned to operate synchronously and connected to said source of alternating current and feeding rectified current to said battery, said rectified current being obtained from a portion of said winding so that the voltage thereof is in excess of the battery voltage.

8. A system of the character described comprising, a winding serving as a source of alternating current, a consumption circuit whose established voltage is less than the voltage of said source of alternating current, a battery of a voltage sufficient to supply current to said consumption circuit, means for alternatively associating said consumption circuit with said battery and a portion of said winding of a voltage commensurate with the established voltage of said consumption circuit, and a rectifier proportioned to operate synchronously and connected to said source of alternating current and feeding rectified current to said battery, said rectified current being obtained from a portion of said winding so that the voltage thereof is in excess of the battery voltage but less than the total voltage of said source of alternating current.

In witness whereof, I hereunto subscribe my name this 10th day of June A. D., 1920.

ALEXANDER C. REID.